July 31, 1956  E. F. HOLLENSHEAD  2,756,531
CASTING ROD HANDLE
Filed Oct. 21, 1953  3 Sheets-Sheet 1
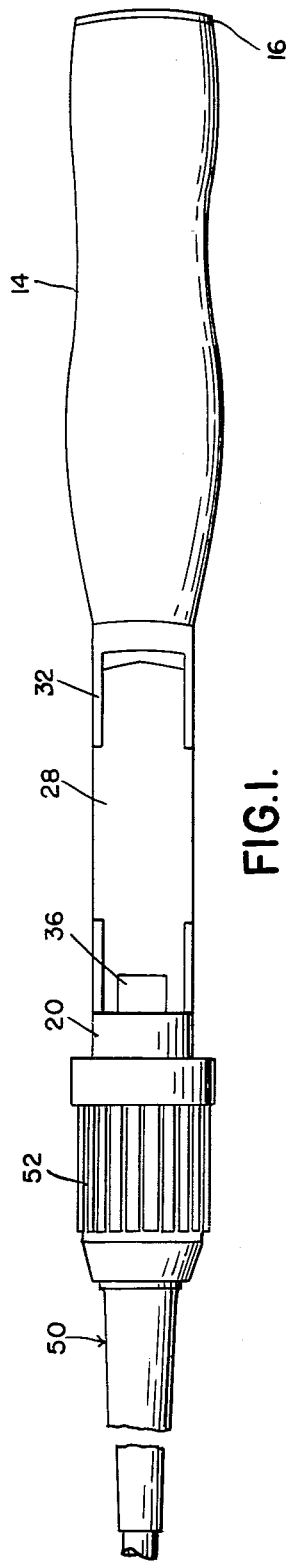
FIG.I.
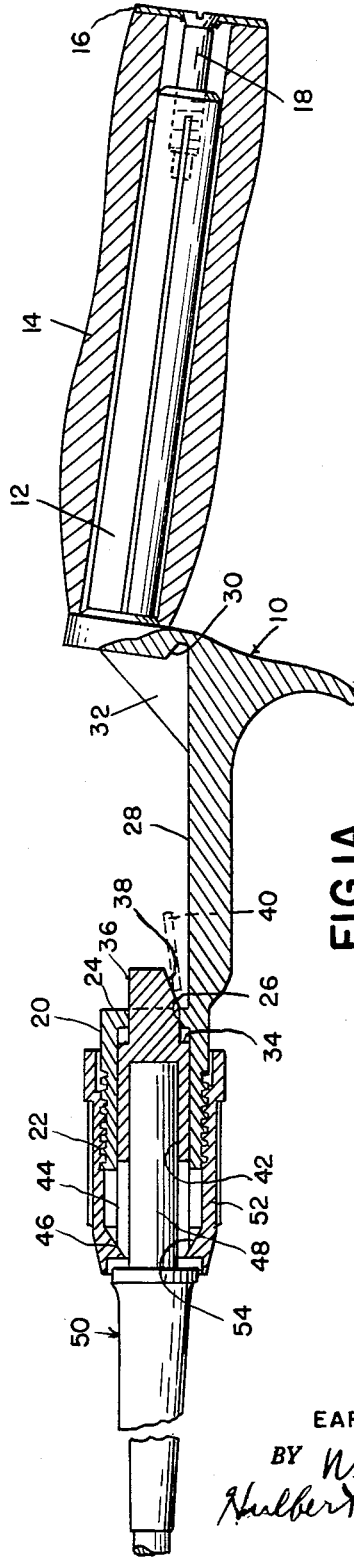
FIG.IA.
*INVENTOR.*
EARL F. HOLLENSHEAD
BY Whittemore,
Hulbert & Belknap
ATTORNEYS July 31, 1956 E. F. HOLLENSHEAD 2,756,531
CASTING ROD HANDLE
Filed Oct. 21, 1953 3 Sheets-Sheet 2

INVENTOR.
EARL F. HOLLENSHEAD
BY Whittemore,
Hulbert & Belknap
ATTORNEYS

July 31, 1956

E. F. HOLLENSHEAD 2,756,531

CASTING ROD HANDLE

Filed Oct. 21, 1953

INVENTOR.
EARL F. HOLLENSHEAD
BY Whittemore,
Hulbert & Belknap
ATTORNEYS

United States Patent Office 2,756,531
Patented July 31, 1956

---

2,756,531

CASTING ROD HANDLE

Earl Finley Hollenshead, Windsor, Ontario, Canada, assignor to Great Lakes Products, Inc., Detroit, Mich., a corporation of Michigan Application October 21, 1953, Serial No. 387,363

1 Claim. (Cl. 43—22)

The present invention relates to a rod handle assembly for fishing rods.

It is an object of the present invention to provide a rod handle assembly having a single operating member effective to clamp the rear end of a rod assembly in place and to simultaneously clamp a reel to the handle assembly.

More specifically, it is an object of the present invention to provide a rod handle assembly having at the forward end thereof a sleeve and having in rear of said sleeve a laterally offset reel seat, the rear end of a rod assembly being receivable and longitudinally movable in said sleeve, reel clamping means operable by rearward movement of said rod assembly in said sleeve and means for locking said rod assembly in said sleeve.

It is a further object of the present invention to provide a handle assembly comprising a sleeve at the forward end thereof, a reel seat at the rearward end of said sleeve, a collet longitudinally movable in said sleeve and having a reduced reel clamping portion extending rearwardly of said sleeve, a lock nut threaded to said sleeve, camming means on said lock nut and a collet engageable by rearward movement of said lock nut on said sleeve to initially move said collet rearwardly in reel clamping movement and effective thereafter to compress said collet radially to grip the rear end of a rod assembly therein.

It is a further object of the present invention to provide a rod handle assembly characterized by a single actuating member effective upon limited rotation to effect both clamping of a reel on the handle and clamping of a rod assembly thereto.

Other objects and features of the invention will become apparent as the description proceeds, especially when taken in conjunction with the accompanying drawings, wherein:

Figure 1 is a plan view of a preferred embodiment of the present invention.

Figure 1A is a longitudinal view, partly in section, of the embodiment of the invention illustrated in Figure 1.

Figure 2:
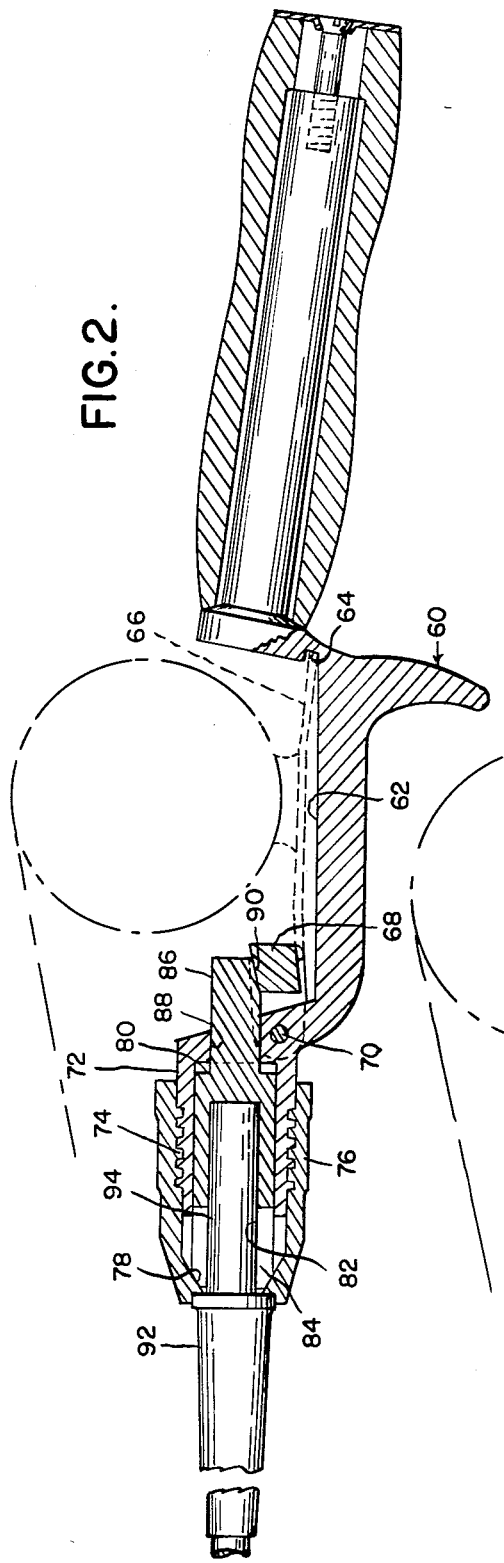
Figure 2 is a side elevation view, partly in section, of a first modification of the present invention.

Referring now to Figures 1 and 1A there is illustrated at 10 a handle frame including a grip supporting portion 12 to which a grip 14 is secured as by a butt plate 16 held in place by a butt plate screw 18 extending into a tapped recess at the rear end of the grip supporting portion 12. At the forward end of the handle frame there is provided a generally tubular sleeve 20 having exterior threads as indicated at 22, and provided with an inwardly extending flange 24 defining an opening 26 of smaller cross-section than the interior of the collet. Preferably, the flange 24 is so shaped as to form opening 26 as of non-circular shape, as for example square.

Intermediate the sleeve 20 and the grip supporting portion is a reel seat 28 laterally offset from the axis of the sleeve 20. At its rear end the reel seat 28 is shaped to provide a notch or recess 30 shaped to receive the rear end of a reel mounting plate, and includes lateral seat portions 32 to prevent lateral movement of the reel plate.

Located within the sleeve 20 is a collet 34 having a rearwardly extending reel clamping portion 36 extending through the opening 26 and shaped in conformity therewith to prevent rotation of the collet in the sleeve. Preferably, the rearwardly extending portion 36 of the collet has a camming surface 38 engageable with the front end of the reel mounting plate, a portion of the plate being indicated in dotted lines 40. The forward end of the collet 34 has a tubular recess or socket 42 therein and the side walls at the forward end of the recess are slotted as indicated at 44 to provide a radially compressible, rod gripping structure. The extreme forward ends of the fingers provided between the slots 44 are conically tapered as indicated at 46. The recess or socket 42 is designed to have substantial clearance with the rear end portion 48 of a rod assembly generally indicated at 50. For example, clearance between the rear end portion of the rod assembly and the recess or socket 42 when the collet is not compressed, may be on the order of .002".

Mounted on the threads 22 of the sleeve is a lock nut 52 having at its forward end an inwardly extending conically tapered surface 54 cooperable with the conical surface 46 at the forward end of the collet. The cone angles of the surfaces 46 and 54 are selected such that upon insertion of the rod assembly into the recess or socket 42 of the collet and upon rearward movement of the lock nut 52, the collet is first moved rearwardly to cause the rearwardly extending portion thereof to engage the forward end of the reel mounting plate 40. Thereafter, further rearward movement of the collet 34 is prevented and further rearward movement of the lock nut 52 compresses the forward end of the collet against the rear end of the rod assembly to grip the rod firmly in position.

It will be observed that the construction just described permits separation of the rod assembly and the reel from the handle by a limited movement of the lock nut 52. It will further be observed that the lock nut 52 retains the collet as a permanent part of the assembly with the handle. In order to remove the collet from the handle assembly it would be necessary to remove the lock nut therefrom. If desired, means may be provided limiting movement of the lock nut on the handle so as to prevent separation of the lock nut from the handle and this means will also of course prevent movement of the collet from the handle.

It will further be observed that the present construction permits the simplest possible assembly of the rod and reel with the handle and permits the rod to be properly positioned with the line guides in desired position and thereafter locked in such position by simple rotational movement of the lock nut, which at the same time is effective to clamp the reel in position.

Referring now to Figure 2 there is illustrated a handle frame 60 including a laterally offset reel seat 62 having at its rear end a notch 64 adapted to receive the rear end of a reel mounting plate 66. Carried at the forward end of the reel seat 62 by the handle frame is a pivoted reel clamping saddle 68, the pivot therefor being illustrated at 70. Forwardly of the reel seat 62 the handle includes a generally tubular sleeve 72 having external threads 74 and carrying an internally threaded lock nut 76, the forward end of which is provided with an inwardly extending conical tapered surface 78.

Received within the sleeve 72 is a collet 80 having a socket or recess 82 the forward end of which is slotted as indicated at 84 to provide radially compressible structure. The collet 80 includes a rearwardly extending reduced portion 86 which extends through a correspondingly reduced opening 88 provided at the rear of the sleeve, the opening 88 and reduced portion 86 preferably being of non-circular cross-section. The portion 86 of the collet includes a camming surface 90 engageable with a correspondingly shaped surface on the saddle 68 so that as the collet is moved rearwardly it rotate the saddle 68 clockwise into clamping relation with the forward end of the reel mounting plate 66.

The rod assembly 92 has a portion 94 received within the collet. As the lock nut 76 is rotated to move it rearwardly, the conical surface 78 engages the corresponding conical surface at the forward end of the collet and moves the collet rearwardly to swing the saddle into reel clamping position. When the reel is firmly clamped in place further rearward movement of the collet is prevented and thereafter, further rearward movement of the lock nut results in inward compression of the forward end of the collet into rod gripping position. Again, it will be observed that the limited rotational movement of the lock nut 76 is effective to release the rod assembly for removal and to free the reel clamping means. Again, the collet 80 is designed to be a permanent part of the handle assembly and is retained against separation therefrom by the lock nut 76. If desired, means may be provided effective to prevent complete removal of the lock nut from the handle assembly.

Figure 3:
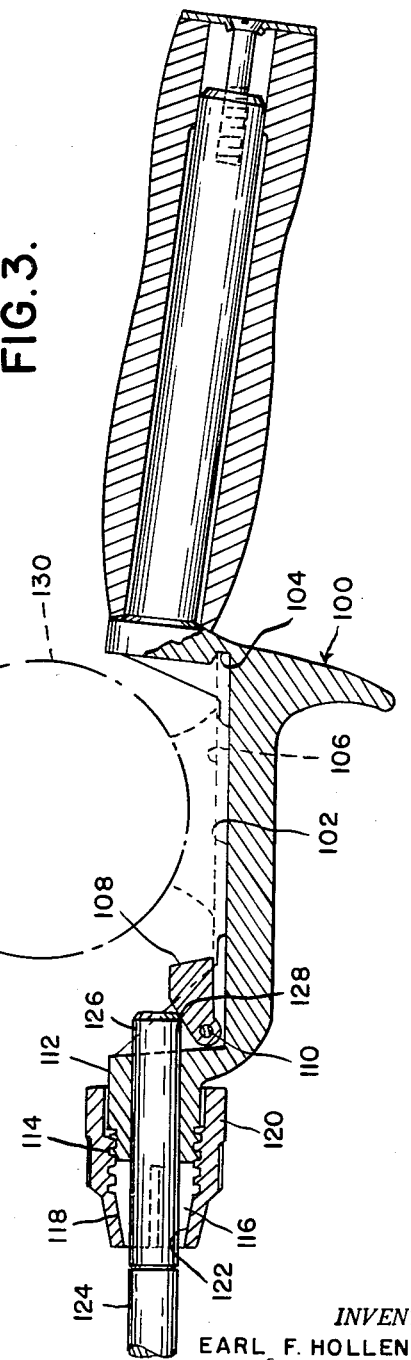
Figure 3 is a longitudinal section of a second modification of the present invention.

Referring now to Figure 3 there is illustrated yet another embodiment of the present invention. In this figure the handle frame is illustrated at 100 and has a reel seat 102 thereon including a notch 104 at the rear end thereof for receiving the rear end of the reel mounting plate 106. Adjacent the forward end of the reel seat is a reel clamping saddle 108 pivoted to the handle frame as indicated at 110. Forwardly of the reel seat is a sleeve 112 which in this instance is externally threaded as indicated at 114 and is provided with longitudinal slots 116 to render the forward end thereof radially compressible. The forward end portion of the sleeve 112 is conically tapered as indicated at 118.

Associated with the sleeve 112 is a lock nut 120, the forward end portion of which is provided with an inwardly extending conical locking or clamping surface 122 which conforms to the conical surface 118 on the forward end of the sleeve.

In this instance it is contemplated that a rod assembly will be provided, such as illustrated at 124, the rear end portion 126 of which is adapted to extend completely through the sleeve into engagement with a camming surface 128 provided on the upper end of the saddle 108.

In order to clamp the reel indicated in dotted lines at 130 in position, the reel mounting plate is engaged in the recess 104 and the forward end thereof is engaged under the saddle 108. Thereafter, the rod assembly 124 is forced rearwardly through the sleeve until the rear end portion 126 of the rod assembly engages the saddle and forces it into locking engagement with the reel mounting plate. Thereafter, the lock nut 120 is rotated to move it rearwardly and the camming surface 122 thereon engages the corresponding surface 118 at the forward end of the sleeve, thereby compressing the forward portion of the sleeve into clamping engagement with the rod assembly.

Figure 4:
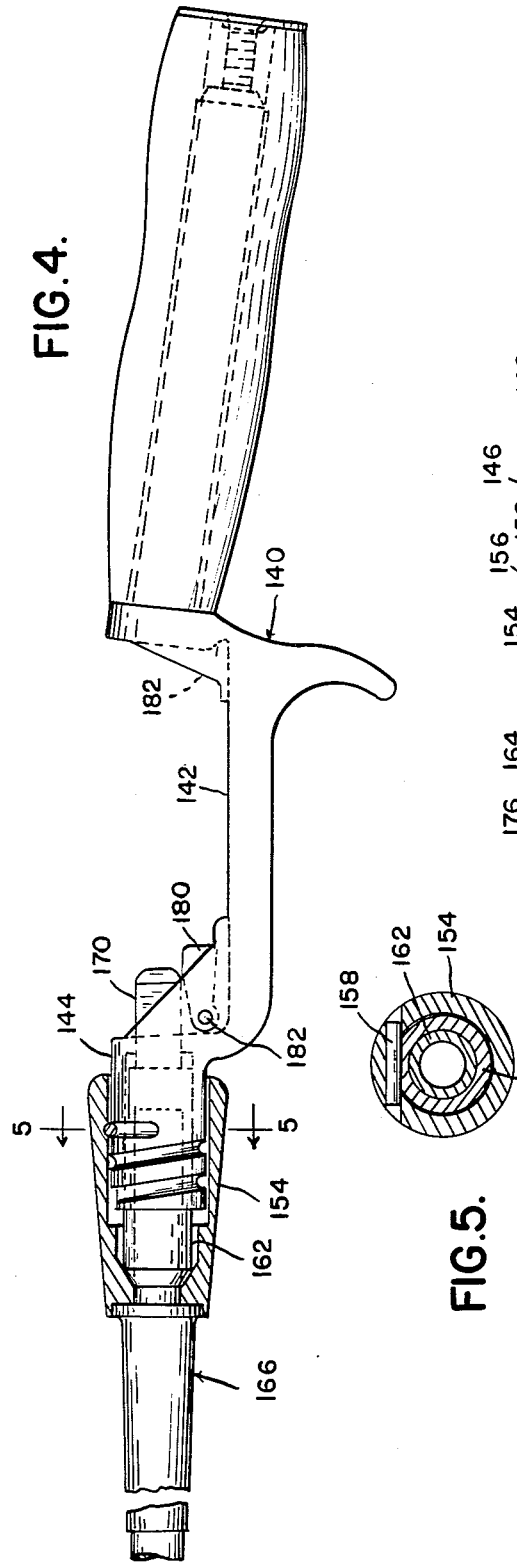
Figure 4 is a side elevation, partly in section, of a third embodiment of the present invention.
Figure 5:
Figure 5 is a sectional view on the line 5—5, Figure 4.
Figure 6:
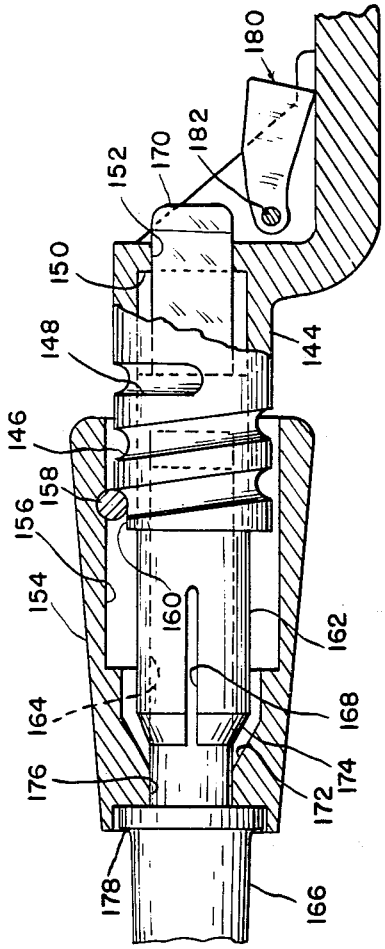
Figure 6 is an enlarged fragmentary side elevation, partly in section, of the construction shown in Figure 4.

Referring now to Figures 4–6 there is illustrated another embodiment of the present invention. In this embodiment of the invention the handle 140 includes an offset reel seat 142 and a forwardly extending sleeve 144. The exterior surface of the sleeve is provided with a helical groove or channel 146 as best seen in Figure 6, this groove comprising a small number of turns and terminating in an annular portion 148 disposed in a plane perpendicular to the axis of the sleeve 144. The sleeve is provided at its rear end with a shoulder 150 having a non-circular opening 152 therethrough.

Carried by the sleeve portion 144 for rotation thereon and corresponding axial movement relative thereto is a lock nut in the form of a generally tubular element 154 having an enlarged opening 156 at its rear end intersected by a transversely extending pin 158, best illustrated in Figure 5. The groove 146 is shaped to receive the pin 158 which operates therein in the manner of a thread. In order to facilitate engagement between the pin 158 and the helical groove 146, the forward end of the sleeve is flattened off as indicated at 160, the plane of the flattened off portion being substantially parallel to the axis of the sleeve and substantially tangent to the bottom of the helical groove 146.

Slidably received within the sleeve 144 is a collet 162 having an opening 164 in its forward end shaped to receive the rear end of the handle and rod assembly 166. The forward end of the collet is provided with axial slots as indicated at 168, to provide for inward clamping movement so as to lock the handle and rod assembly in desired position. At its rear end the collet is provided with a reduced extension 170, the extension being of non-circular cross-section to cooperate with the non-circular opening 152 so as to retain the collet against rotation in the sleeve while providing for axial movement thereof.

Adjacent its forward end the lock nut is provided with an inclined camming or locking surface 172 which cooperates with a conically tapered surface 174 on the forward end of the collet. Forwardly of the inclined surface 172 the lock nut is provided with a reduced cylindrical portion 176 which engages the rearward end portion of the handle and rod assembly 166. Forwardly of the cylindrical portion 176 is a shoulder 178 engageable with the handle and rod assembly, as best illustrated in Figure 6.

Clamping means to retain the reel on the reel seat comprise a saddle 180 mounted for rocking movement about a pivot pin 182. The upper surface of the saddle 180 is shaped to be engaged by the rear end of the reduced portion 170 of the collet 162, the rear end of the reduced portion of the collet being rounded for this purpose, so as to swing the saddle 180 in a clockwise direction as seen in Figure 6 into engagement with the upper surface of the forward part of a reel mounting plate.

The helical groove 146 is disposed at a locking angle as for example between 7 and 10 degrees, selected to provide substantial axial movement upon limited rotation while at the same time being effective to lock the parts in clamped position.

In order to effect assembly of the handle and rod assembly and reel to the handle it is only necessary to insert the reduced rear end portion of the handle and rod assembly through the cylindrical portion 176 of the lock nut and into the opening 164 in the collet. The reel is positioned on the reel seat with its rearward end engaged in a recess 182 and with its forward end disposed beneath the pivoted saddle 180. At this time the lock nut 154 is rotated in the direction to produce rearward movement thereof and to bring the conical camming surface 172 into engagement with the conical surface 174 of the collet. Continued rotation of the lock nut shifts the collet rearwardly until its reduced rear end portion 170 engages the saddle 180 and swings it downwardly and clamps it in locking relation overlying the forward end of the reel base plate. This of course prevents rearward movement of the collet and continued rotation of the lock nut 154 results in compressing the forward end of the collet to clamp the reduced rear end portion of the handle and rod assembly in position.

Normally, the lock nut 154 is never removed from the handle and of course prevents separation between the handle and more particularly the sleeve portion of the handle and the collet. A very slight rotation of the lock nut is sufficient to release the handle and rod assembly for removal and further rotation of the lock nut will permit forward movement of the collet a distance sufficient to permit release of the reel.

The drawings and the foregoing specification constitute a description of the improved casting rod handle in such full, clear, concise and exact terms as to enable any person skilled in the art to practice the invention, the scope of which is indicated by the appended claim.

What I claim as my invention is:

A rod handle assembly comprising a handle frame having at its front end a longitudinally extending externally threaded tubular sleeve open at both ends, said frame having a reel seat in rear of said sleeve laterally offset from the axis thereof, a collet slidable longitudinally in said sleeve, said collet having a reel clamping portion extending rearwardly from said sleeve, the front end of said collet having a conical surface and being axially slotted to provide for inward radial compression, a reel and rod clamp nut threaded on said sleeve having an internal conical surface engaging the conical surface at the forward end of said collet to initially force said collet rearwardly to clamp a reel on said reel seat and thereafter to compress the slotted end of said collet radially inwardly to clamp the end of a detachable rod assembly therein, said nut being releasable to provide for forward movement of said collet to release the rod assembly for removal from the handle assembly and to provide for removal of the reel from the handle assembly while retaining the collet and nut on the handle assembly.

References Cited in the file of this patent

UNITED STATES PATENTS

| | | |
|---|---|---|
| 271,143 | Smith | Jan. 23, 1883 |
| 1,591,122 | Gephart | July 6, 1926 |
| 1,965,796 | Dunkelberger | July 10, 1934 |
| 2,421,240 | Camburn | May 27, 1947 |
| 2,583,831 | Goergen | Jan. 29, 1952 |
| 2,594,536 | Beyer | Apr. 29, 1952 |